United States Patent
Rushton et al.

(10) Patent No.: US 7,075,874 B2
(45) Date of Patent: Jul. 11, 2006

(54) DATA STORAGE DEVICE MONITORING SYSTEM, METHOD AND REMOVABLE DATA CARRIER USE WITH DATA STORAGE SYSTEMS

(75) Inventors: Nigel Kevin Rushton, Bristol (GB); Simon Rae, Bristol (GB); Mark Robert Watkins, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 686 days.

(21) Appl. No.: 09/905,984

(22) Filed: Jul. 17, 2001

(65) Prior Publication Data

US 2003/0016609 A1    Jan. 23, 2003

(51) Int. Cl.
    *G11B 15/04*    (2006.01)
(52) U.S. Cl. .................... 369/53.21; 360/71
(58) Field of Classification Search ............ 369/53.25, 369/53.38, 53.21, 30.6, 30.29, 30.33, 30.34, 369/30.39, 30.54; 360/92, 69, 71, 72.1, 72.2
    See application file for complete search history.

(56) References Cited

U.S. PATENT DOCUMENTS

| | | | |
|---|---|---|---|
| 4,338,644 A | | 7/1982 | Staar |
| 5,726,817 A | * | 3/1998 | Oguro et al. .................. 360/25 |
| 5,901,007 A | * | 5/1999 | Oguro et al. .................. 360/69 |
| 6,084,736 A | * | 7/2000 | Kurokawa et al. ............ 360/71 |
| 6,172,833 B1 | * | 1/2001 | Fry et al. ...................... 360/71 |
| 6,421,196 B1 | * | 7/2002 | Takayama et al. ......... 369/52.1 |
| 6,556,768 B1 | * | 4/2003 | Nakajima et al. ............. 360/69 |
| 6,587,298 B1 | * | 7/2003 | Yamada ..................... 360/72.1 |
| 6,621,650 B1 | * | 9/2003 | Takayama .................... 360/69 |
| 6,624,959 B1 | * | 9/2003 | Takayama .................... 360/69 |
| 6,643,086 B1 | * | 11/2003 | Hiramoto et al. ............. 360/69 |
| 6,710,962 B1 | * | 3/2004 | Caverly et al. ............... 360/69 |

FOREIGN PATENT DOCUMENTS

| | | |
|---|---|---|
| EP | 0646914 B1 | 9/1994 |
| EP | 0580434 B1 | 3/1999 |
| EP | 0605886 B1 | 4/1999 |
| EP | 0640972 B1 | 6/1999 |
| EP | 0942427 A2 | 9/1999 |
| WO | 89/10615 | 11/1989 |

* cited by examiner

*Primary Examiner*—Thang V. Tran

(57) ABSTRACT

A data storage device comprises a removable and replaceable magnetic tape cassette provided with a software control write protect switch. The switch is adapted to have a first condition in which data may be written to said magnetic tape and a second condition in which said switch is adapted to cause the blocking of a write operation to said tape. The switch is contained within a non-volatile electronic memory device and is electronically configurable between its first and second conditions remotely via a control signal.

39 Claims, 5 Drawing Sheets

Advice Section

DATA STORAGE DEVICE MONITORING SYSTEM, METHOD AND REMOVABLE DATA CARRIER USE WITH DATA STORAGE SYSTEMS

FIELD OF THE INVENTION

This invention relates to a data storage device monitoring system, method and data carriers. More particularly, but not exclusively, it relates to a monitoring system and method that predict or monitor integrity problems associated with a data storage device.

BACKGROUND TO THE INVENTION

Current removable and exchangeable data storage media, for example magnetic tapes, hard discs and CDs, become more prone to the occurrence of error during read and write operations as their lifetime progresses. There is currently no means available to log accurately this increase in error rate and predict from it when a medium passes an acceptable threshold of reliability and becomes a potential systems failure point. Indeed, realising this, and that it is important, is a contributory part of the present invention.

Different data storage media handle errors in different ways. For example, CDs have high error rates but use high power error correction algorithms to compensate for this, whereas magnetic hard discs have very few errors and therefore use only low level error correction algorithms.

Whilst it is known to retain information relating to the usage of a data storage medium upon an advice section of the medium itself (e.g. tape usage information on the magnetic tape itself), repeated and frequent accessing of this section of media leads to wear and possible failure of this section of medium (as it is typically read/written to more than other parts of a tape). This early life failure can lead to the premature failure or retirement of the medium. Even when the section of the medium does not fail completely its increased unreliability with use is clearly undesirable. Additionally, the requirement to scan through media in order to locate the advice section means that this is a slow process not allowing instantaneous access to the usage data. The prior art usage data is stored on a tape, for example, not to create and manage a history log for tape quality management purposes, but rather to track where data came from—information that is retained for stored data-related purposes rather than for tape life-estimating purposes or quality of data establishing purposes.

In large tape libraries, in which there are typically tens of drives and thousands of media, and robot systems load media into the drives, it is virtually impossible to manage attrition of the media by manual means. This results in complete failure of media with its attendant loss of data.

SUMMARY OF INVENTION

It is an object of at least one embodiment of the present invention to provide a data storage device monitoring method that, at least partly, ameliorates at least one of the above-mentioned problems/difficulties.

It is a further object of at least one embodiment of the present invention to provide a data storage device monitoring system that at least partly ameliorates at least one of the above-mentioned problems/difficulties.

It is a yet further object of an embodiment of the present invention to provide a new removable and/or replaceable data storage medium.

The term 'utility' will be used hereinafter to refer to either, or both, of measures of performance or/and quality of a data storage medium According to a first aspect of the present invention there is provided a method of monitoring a data storage device having a removable data storage medium comprising the steps of:

i) writing a data element to a memory element associated with the data storage device, the data element being indicative of at least one of: (I) the utility of a data storage medium of the data storage device; (II) a parameter or value associated with the level of usage of the data storage device;

ii) reading said data element from said memory element; and iii) executing an action in response to an evaluation of said data element.

The method may comprise preventing the writing of further data to the data storage medium.

The method may comprise displaying the result of the evaluation to a user of the device. The method may comprise exchanging the data storage device for another data storage device, possibly copying data from the old device to the new device.

The method may comprise providing within said data element information relating to any one or more (or any combination) of the following: load count, guide usage, tape pulling hours, error correction rates, write pass counter, number of updates, end of data, hard failure count. The method may comprise providing said data storage device in any one of the following forms: a cassette containing magnetic tape, a magnetic disc, a CD, a magneto-optical disc, a mini-disc. The method may comprise providing the memory element in the form of a non-volatile memory element. The method may comprise providing the memory element in the form any one of the following: E 2PROM, flash card.

The method may comprise generating a history of the usage of the storage device from said data element. The method may comprise containing in said history one or more of, or all of, timestamps, date stamps and writer identifications for each time the device was written to.

The method may comprise locating said memory element upon said storage device. The method may comprise providing the memory element in a different form to that of the data storage medium.

Thus the actual performance utility of the data storage medium, such as a tape cassette, can be monitored and an alarm/alert provided when the performance falls below an acceptable level, triggering some action such as exchanging the tape (or other data storage device) for a new one/less error-prone one. Instead of, or, in addition to, monitoring actual performance-related characteristics or parameters, it is possible to monitor/establish (for example count) a parameter associated with the level of usage of a tape (or other device). The action could be effected when a data storage device is predicted to be likely to become errorprone, instead of/as well as by looking to see if it actually is exhibiting degraded performance.

According to a second aspect of the present invention there is provided a method of data storage device monitoring comprising the steps of:

i) reading a data element of the device from a memory element associated with the data storage device, said data element being indicative of at least one of (I) the utility of a data storage medium of the device; (II); a parameter or value associated with the level of usage of the data storage device; and ii) executing an action in response to an evaluation of said data element.

The method may comprise preventing the writing of further data to the data storage medium. The method may comprise preventing the writing of further data to the data storage medium.

The method may comprise displaying the result of the evaluation to a user of the device.

The method may comprise providing within said data element information relating to any one of the following: load count, guide usage, tape pulling hours, error correction rates, write pass counter, number of updates, end of data, hard failure count. The method may comprise providing said data storage device in any one of the following forms: a cassette containing magnetic tape, a magnetic disc, a CD, a magneto-optical disc, a mini-disc. The method may comprise providing the memory element in the form of a non-volatile memory element. The method may comprise providing the memory element in the form any one of the following: E 2PROM, flash card.

The method may comprise generating a history of the usage of the storage device from said data element. The method may comprise containing in said history timestamps, date stamps and writer identifications for each time the device was written to.

The method may comprise locating (finding) said memory element upon said storage device. The method may comprise providing the memory element in a different form to that of the data storage medium.

According to a third aspect of the present invention there is provided a data storage device monitoring method comprising the steps of;
i) writing at least one of (a) a data element indicative of the utility of a data storage medium of the device to a memory element associated with the data storage device; (b) a data element indicative of the level of usage of the data storage medium of the device to a memory element associated with the data storage device;
ii) reading said data element from said memory element;
iii) comparing said data element with a reference; and
iv) executing an action if said data element has a value outside a threshold related to the reference.

The method may comprise informing a user of the device that the utility and/or usage of the data storage medium is outside the threshold value. The method may comprise preventing the writing of further data to the data storage medium.

The method may comprise containing in the data element indicative of the utility data relating to any one or combination of data types from the following non-exhaustive list: load count, guide usage, tape pulling hours, error correction rates, write pass counter, number of updates, end of data, hard failure count. The method may comprise containing in the reference complementary data type(s) to the data element data types indicative of the utility.

The method may comprise providing the memory element in the form of a non-volatile memory element. The method may comprise providing the memory element in the form of E 2PROM, flash card. The method may comprise providing the memory element with a data storage capacity of between any two of the following: <250, 250, 500, 1000, 2000, 5000, 10000, >10000 bytes.

The method may comprise reading the data element from the memory element via a radio frequency data link, an inductive data link or a direct electrical connection.

The method may comprise generating a history of the usage of the storage device from said data element. The method may comprise containing in said history timestamps, date stamps and writer identifications for each time the device was written to.

The method may comprise locating (finding) said memory element upon said storage device. The method may comprise providing the memory element in a different form to that of the data storage medium.

According to a fourth aspect of the present invention there is provided a data storage device monitoring method comprising the steps of:
i) reading a data element from a memory element associated with the data storage device, said data element being indicative of at least one of (a) the utility of a data storage medium of the device; (b) the level of past usage of the data storage device;
ii) comparing said data element with a reference; and
iii) executing an action if said data element has a value outside a threshold related to the reference.

The method may comprise informing a user of the device that the utility of the data storage medium is outside the threshold value. The method may comprise preventing the writing of further data to the data storage medium.

The method may comprise containing in the data element indicative of the utility data relating to any one or combination, of data types from the following non-exhaustive list: load count, guide usage, tape pulling hours, error correction rates, write pass counter, number of updates, end of data, hard failure count. The method may comprise containing in the reference complementary data type(s) to the data element indicative of the utility.

The method may comprise the memory element in the form of a nonvolatile memory element. The method may comprise providing the memory element in the form of E 2PROM, flash card. The method may comprise providing the memory element with a data storage capacity of between any two of the following: <250, 250, 500, 1000, 2000, 5000, 1000, >1000 bytes.

The method may comprise reading the data element from the memory element via a radio frequency data link, an inductive data link or a direct electrical connection.

The method may comprise generating a history of the usage of the storage device from said data element. The method may comprise containing in said history timestamps, date stamps and writer identifications for each time the device was written to.

The method may comprise locating said memory element upon said storage device. The method may comprise providing the memory element in a different form to that of the data storage medium.

According to a fifth aspect of the present invention there is provided a data storage device comprising a data storage medium and a memory element wherein the memory element is arranged to retain data indicative of the utility or level of past usage of the data storage medium.

The device may comprise a casing or cassette. The memory element may be associated with the casing or cassette. The memory element may be a non volatile memory medium, possibly not the medium upon which the main data is stored (or not the same region of the medium). The memory element may be an E 2Prom or a flash card. The main memory/data storage medium of the device may be magnetic tape, or disc. The memory element may be arranged to store data relating to either, or both, of the performance or/and the usage of the data storage medium, in use. The memory element may be arranged to store any one or combination of data types from the following non-exhaustive list: load count, guide usage, tape pulling hours, error correction rates, write pass counter, number of updates, end of data, hard failure count. The memory element may have contact pads. The memory element may be arranged to communicate with a data transfer head, in use. The memory element may be arranged to communicate with the data transfer head via any one, or combination, of the following: radio frequency link, inductive link, and direct electrical connection.

The data storage device may be any one of the following: tape (e.g. magnetic tape), CD, magnetic disc, magneto-optical disc.

According to a sixth aspect of the present invention there is provided a data storage device monitoring system adapted for use with a data storage device according to the fourth aspect of the present invention comprising a first data transfer device arranged to transfer data between a data source and the data storage medium, in use, and a second data transfer device arranged to transfer data between the monitoring system and the memory element, in use.

The first data transfer device may comprise a plurality of read heads and/or a plurality of write heads. The monitoring system may comprise a partitioner that may be arranged to partition data from the data source, in use. The monitoring system may comprise an allocation unit that may be arranged to allocate a section of the partitioned data to a write head.

The second transfer device may comprise any of the following: a radio frequency transceiver, an inductive transceiver, an electrical contact.

The monitoring system may comprise a comparator. The comparator may be arranged to store threshold data therein. The comparator may be arranged to store data relating to either or both of data storage medium performance or/and data storage medium usage. The comparator may be arrange to store any one or combination, of data types from the following non-exhaustive list: load count, guide usage, tape pulling hours, error correction rates, write pass counter, number of updates, end of data, hard failure count. The comparator may form part of a control unit or a processor.

The first and second data transfer devices may be produced by a common data transfer device.

The first data transfer device may form part of, or be any one of, the following: a magnetic tape drive, a CD drive, a magnetic disc drive, a magneto-optical disc drive, a mini disc drive.

According to a seventh aspect of the present invention there is provided a data retrieval system comprising a data storage device according to the fourth aspect of the present invention, a first data transfer device arranged to transfer data between a data source and the data storage medium, in use, and a second data transfer device that is arranged to transfer data between the data retrieval system and the memory element, in use.

The second data transfer device may comprise any of the following: a radio frequency transceiver, an inductive transceiver, an electrical contact.

The data retrieval system may be any one of the following: a magnetic tape drive, a CD drive, a magnetic disc drive, a magneto-optical disc drive, a mini disc drive. The first and second data transfer devices may be the same device.

The data retrieval system may be a library. The library may include a plurality of data reading devices. The library may include a plurality of data storage devices. The library may include a robot arranged to transfer one of the storage devices to one of the reading devices, in use.

According to an eighth aspect of the present invention there is provided a data storage device comprising a removable and replaceable magnetic tape cassette provided with a software control write protect switch, said switch being adapted to have a first condition in which data may be written to said magnetic tape and a second condition in which said switch is adapted to cause the blocking of a write operation to said tape, and wherein said switch is electronically configurable between its first and second conditions remotely via a control signal.

Of course, instead of a magnetic tape cassette, some other removable and replaceable data storage device could be envisaged (e.g. magnetic or optical disc).

Said cassette may have a non-volatile electronic memory device. Said memory device may not be magnetic tape. Said memory device may be a semiconductor chip, for example an E 2PROM or a flash card. Said memory device may comprise said write protect switch.

Preferably said cassette has encoded on it, for example in its main data storage medium (e.g. said magnetic tape), or, if provided, optionally in said memory device, at least one of, and preferably both of: (i) historic usage data indicative of the amount of use that said tape (or device) has had; (ii) historic tape performance data indicative of the level of problems experienced by said tape (or device) in being read from or written to.

According to a ninth aspect of the present invention there is provided a reader, or a writer, device adapted to read from, or write to, a removable data carrier having at least one of data carrier usage data or data carrier performance data, said device having a data transfer head and a control processor adapted to receive signals from said data transfer head, the data transfer head being adapted to read from the data carrier the data carrier usage or performance data and provide said data to said control processor, and wherein said control processor is adapted, in use, to evaluate the data carrier usage or performance data to establish whether the data carrier has exceeded a permissible level of usage and/or level of performance problems, and upon establishing that said data carrier has exceeded said permissible level of usage or problems to generate a write protect signal and transmit said write protect signal to said removable data carrier.

According to a tenth aspect of the present invention there is provided a computer readable medium having stored therein instructions for causing a device to execute the method of any one of the first to fourth aspects of the present invention.

According to a eleventh aspect of the present invention there is provided a program storage device readable by a machine and encoding a program of instructions which when operated upon the machine cause the machine to operate as the device according to any of the fifth to ninth aspects of the present invention.

According to further aspects of the present invention there are provided: a method of controlling the quality of data storage media used to record data; a method of identifying problems with a read/write device; a method of identifying a read/write device which exhibits a problem; a method of identifying a read/write device which requires maintenance.

DETAILED DESCRIPTION OF THE DRAWINGS

It will be appreciated that the following description of preferred embodiments of the invention is exemplary only and is intended to provide a thorough understanding. It will further be appreciated by one skilled in the art that the present invention may be executed without limitation to the embodiments described hereinafter and that well known methods and structures have not been described hereinafter, so as not to unnecessarily obscure the present invention.

Figure 1:
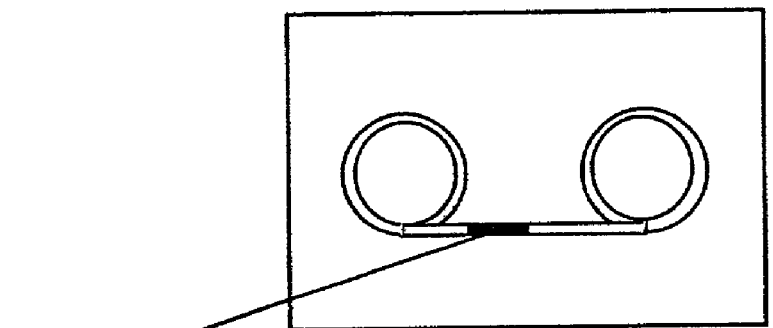
FIG. 1 shows a prior art data storage device.

FIG. 1 is a prior art arrangement of a tape data storage device wherein information relating to the usage of the tape is retained on an advice section of the tape. This arrangement is slow as the tape must be scanned in order to locate and read the advice section and is also prone to accelerated wear of the advice section as the same section of tape (i.e. the advice section in the header or footer of the tape) is written to each time data is written elsewhere on the tape.

Figure 2:
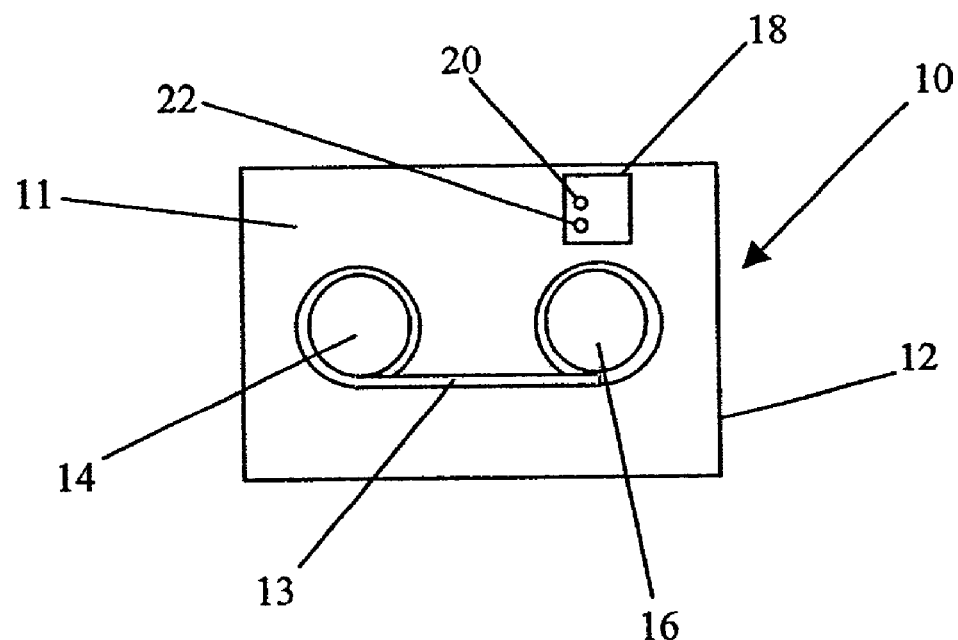
FIG. 2 shows a tape cassette according to an aspect of the present invention.
Figure 3:
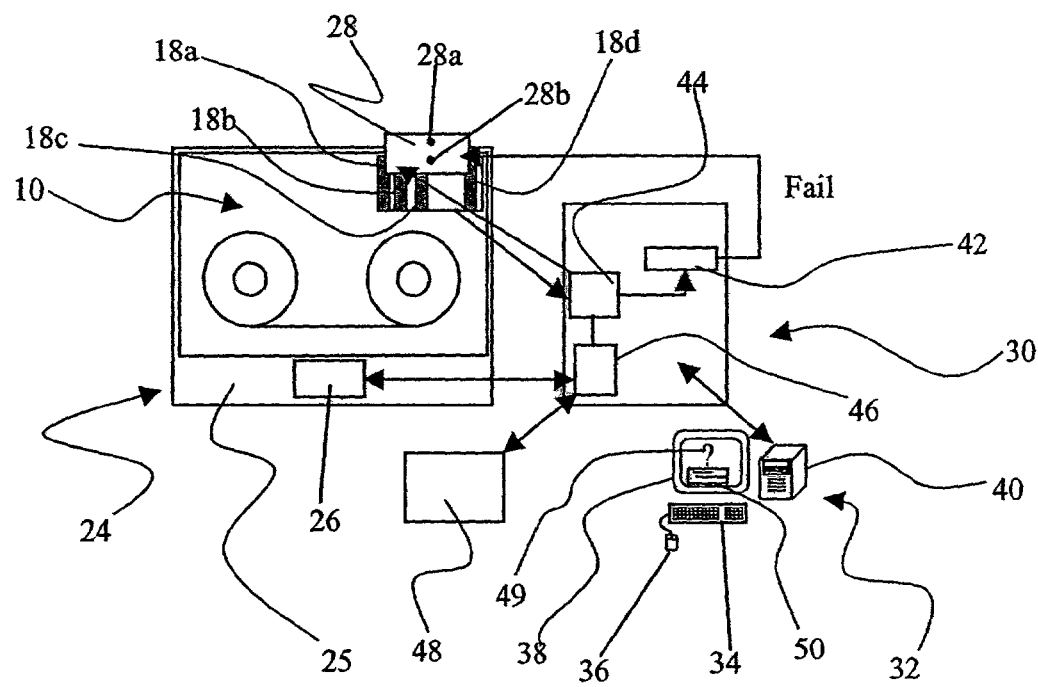
FIG. 3 is a schematic representation tape drive, according to an aspect of the present invention, and the tape cassette of FIG. 2.

Referring now to FIG. 2 a tape data storage device 10 comprises a cassette 11, having a casing 12, magnetic tape 13, spools 14, 16 and a non-volatile memory element 19. The memory element 19 has connector pads 20, 22 mounted upon an outer surface thereof and is typically located in the casing 12 of the device 10. The memory element 18 is typically on E 2typically having 1–10 Kbytes data storage capacity and forms a memory-in-cassette (MCI) arrangement. The tape 13 is wound about the spools 14, 16 in a conventional manner and typically contains a plurality of data tracks, for example 8 or more. The memory element 18 typically contains a communication protocol data block 18a, a usage history data block 18b, a performance data block 18c and a write protect switch data block 18d, as shown in FIG. 3. The write protect switch data block 18d is remotely operable to enable or disable writing to the data storage device 10 by an electronic command.

FIG. 3 shows a tape drive 24 including a tape bay 25 head block 26, memory element read/write unit 28 a control unit 30 and a tape device 10 loaded therein. The tape drive 24 is connected to a terminal 32. The terminal 32 comprises a keyboard 34, a mouse 36, a visual display unit (VDU) 38 and a processor 40. The head block 26 will typically have multiple heads arranged in a read after write arrangement, e.g. 16 pairs of write heads and 16 read heads. The read/write unit 28 has two pins 28a and 28b which contact with the connector pads 20, 22 of the memory element 18, in use.

The control unit 30 includes a comparator 42, a processor 44 and a partition/allocation unit 46.

In use, a data source 48, passes data to the partition/allocation unit 46 that partitions the data and allocates it to individual write heads of the head black 26. The data is passed to the head block 26 and written to the tape 13 in the conventional manner. Details of how the data was partitioned, the amount of data, the end of data are passed to the processor 44. The processor 44 outputs this data to the memory element 18 via the read/write unit 28. Although not shown as such the data source 48 may be the terminal 32. Alternatively, the data source is typically a network, a server or another data storage device.

Typically the tape device 10 is removed from the tape bay 25 after data has been written to the tape 13 and may be transported to another tape drive or re-inserted into the tape drive 24 that wrote the data. If the tape device 10 is re-inserted into the tape drive 24 the read/write unit 28 reads data from the memory element 18 and passes the data to the comparator 42 via the processor 44.

The comparator 42 compares the data from the memory element 18 to a useable lifetime criteria stored within the controller 30. Should the memory element data fail the comparison, for example if the total tape pulling hours of the tape device 10 exceeds the recommended maximum, then the comparator 42 sends a signal to the terminal 32.

The signal typically results in a notification 49 appearing on the VDU 38 informing a user of the terminal 32 if the recommended number of tape pulling hours has been exceeded. The notification 49 will typically also ask if the user wishes to write protect the tape device 10 in order to prevent further degradation of data stored thereupon.

The user will typically indicate their response to the notification 49 either via the keyboard 34, clicking on a dialogue box 50 associated with the notification 49 or a combination of both of these. If the user indicates a desire to write protect the tape 13 the processor 44 issues an instruction via the read/write head 28 to the memory element 18 that sets a flag in the memory element 18. This flag is recognised by tape drives configured to read the memory element and prevents further data being written to the tape 13 whilst still allowing the data recorded thereupon to be read.

Alternatively, the processor 44 may automatically issue the instruction to write protect the tape 13 with or without issuing a notification to the user. This is most likely in large volume automated systems such as tape libraries in which, typically, non-sensitive data is retained. If sensitive data, such as personal files, financial transactions or military information, is retained upon the medium it may be undesirable to prevent deliberate erasure of such information.

If the tape device 10 is inserted into another tape drive that is configured to operate as the tape drive 24 the monitoring arrangement will operate as hereinbefore described. However, should the tape device 10 be inserted into a tape drive without the read/write unit 28 it will operate in the conventional manner without the additional benefit of a media history log to write protect tape devices 10 that exceed their recommended lifetimes. Thus the cassette 11 is usable in existing prior are read/write units, as well as new ones in accordance with the present invention.

In addition to lifetime data the memory element 18 can store information relating to the quality of the data storage medium by reference to, for example read errors that occur. This is important as the number of read errors can increase to an unacceptable level as the tape usage increases. In the case where quality of medium is used as a measure of acceptability of a tape device 10 the comparator 42 will contain threshold levels of suitable quality of medium parameters. Typical parameters used as a measure of the quality of medium include low level (C1) error correction data, hard failure occurrence data.

Figure 4:
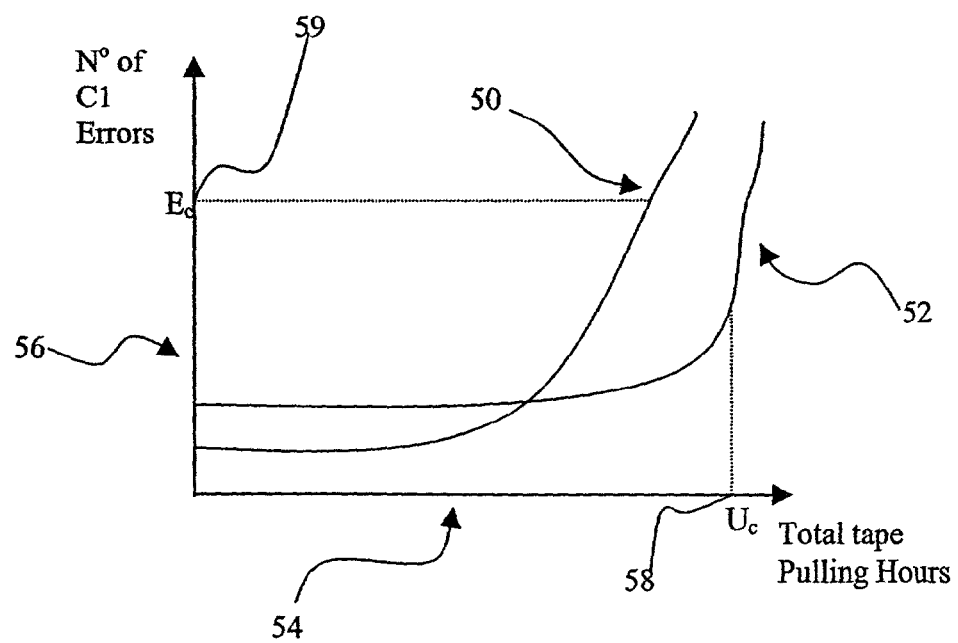
FIG. 4 includes plots representing the number of C1 errors versus the total number of pulling hours and maximum acceptable values for these two parameters.

Referring now to FIG. 4, two plots 50, 52 of total number of tape pulling hours (abscissa axis) 54 versus C1 error count (ordinate axis) 56 are shown. An intercept 58 with the abscissa axis 54 defines the acceptable a threshold number of tape pulling hours after which the tape 13 is considered to be liable to failure. Correspondingly, an intercept 59 with the ordinate axis 56 defines a threshold number of C1, minor, error corrections that are acceptable before the tape 13 is considered to become too error prone for reliable use. It is evident that the two intercepts 58, 59 need not correspond to each other and that either threshold may be used to indicate the unacceptability of the tape for further data transcription. The control unit 30 retains the threshold values and the comparator 44 uses them when deciding whether a tape is suitable for continued usage.

Track index data can be stored in the memory element 18. This can speed up the location and access of data by directing the controllers 30 to drive the spools 14, 16 to approximately the correct location on the tape 13 prior to starting to read data from the tape 13 rather than reading the tape 13 itself to locate the data. Cassettes with memory-in-cassette are known, with the non-volatile memory being provided for this random access to the index data feature.

An additional benefit of this arrangement is that if ever there should be a failure of the tape 13 data detailing the track index, performance of the tape and its utility is not lost and can aid the recovery of data.

Although hereinbefore disclosed that usage and performance data is written to the memory element 18 when data is written to the tape 13 it will be appreciated that data can be written to the tape at any suitable triggering event, for example when the tape device 10 is unloaded from the tape drive 24.

Figure 5:
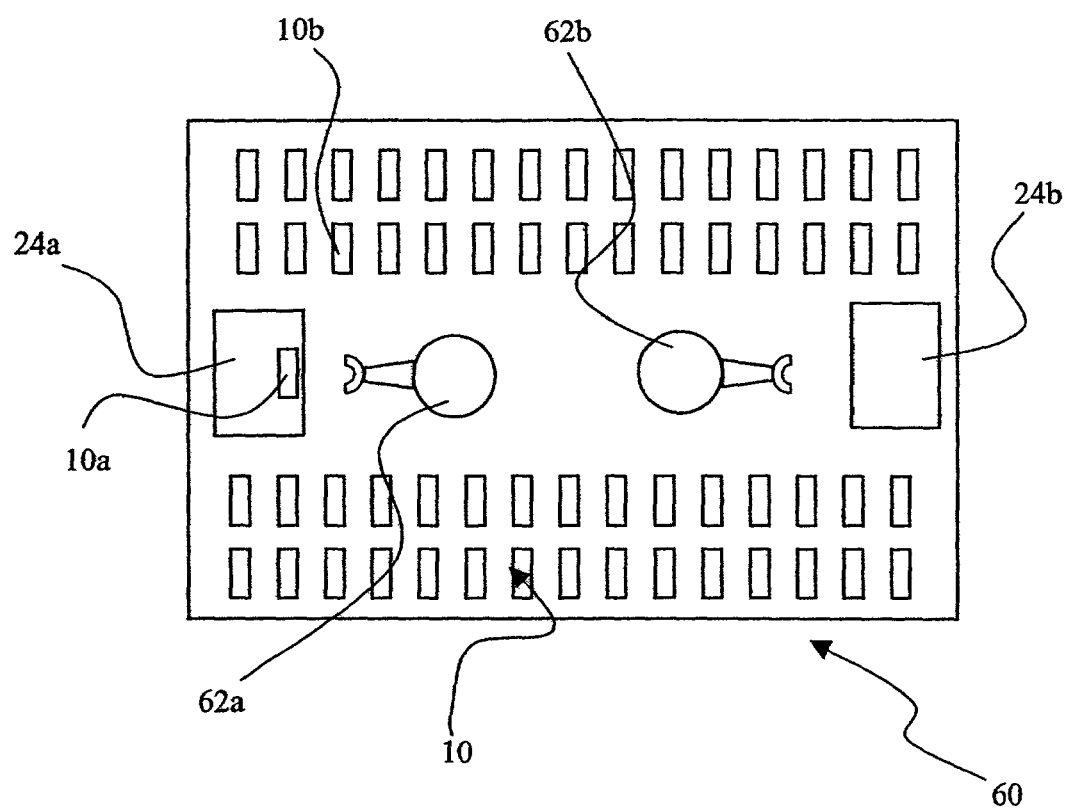
FIG. 5 is a schematic representation of a tape library including tape drives of FIG. 3 and tape cassettes of FIG. 2 according to an aspect of the present invention.

FIG. 5 shows a tape library 60 comprising a plurality of tape devices 10, two tape drives 24a, 24b and two robot arms 62a, 62b. The robot arms 62a, 62b are arranged to load and unload tape devices 10 into and out of their respective tape drives 24a, 24b.

Should a tape 10a fail a usage or medium quality check during a write operation the tape drive 24 will write protect the tape 13 and interrupt the write operation. The tape drive 24a instructs the robot arm 62a to remove the failed tape device 10a and replace it with another, non-compromised, tape device 10b that has not failed a lifetime or medium quality check.

The robot arm 62a may discard the failed tape 10a into a reject bin (not shown). This arrangement allows an operator of the library to reclaim failed tapes and replace them with blank tapes in the library 60.

When the non-compromised tape device 10b is inserted into the drive 24a the write operation re-commences.

Alternatively, the non-compromised tape device 10b can be inserted into tape drive 24b and the contents of the failed tape 10a automatically written to it before the write operation recommences in order to store all of the data set upon a single tape device that has not failed thereby increasing the reliability and ease of retrieval of the copied data set. The failed tape device 10a can be discarded as described hereinbefore.

The term 'utility' will be used hereinafter to refer to either, or both, of measures of performance or/and quality of a medium relating to the medium 13.

Figure 6:
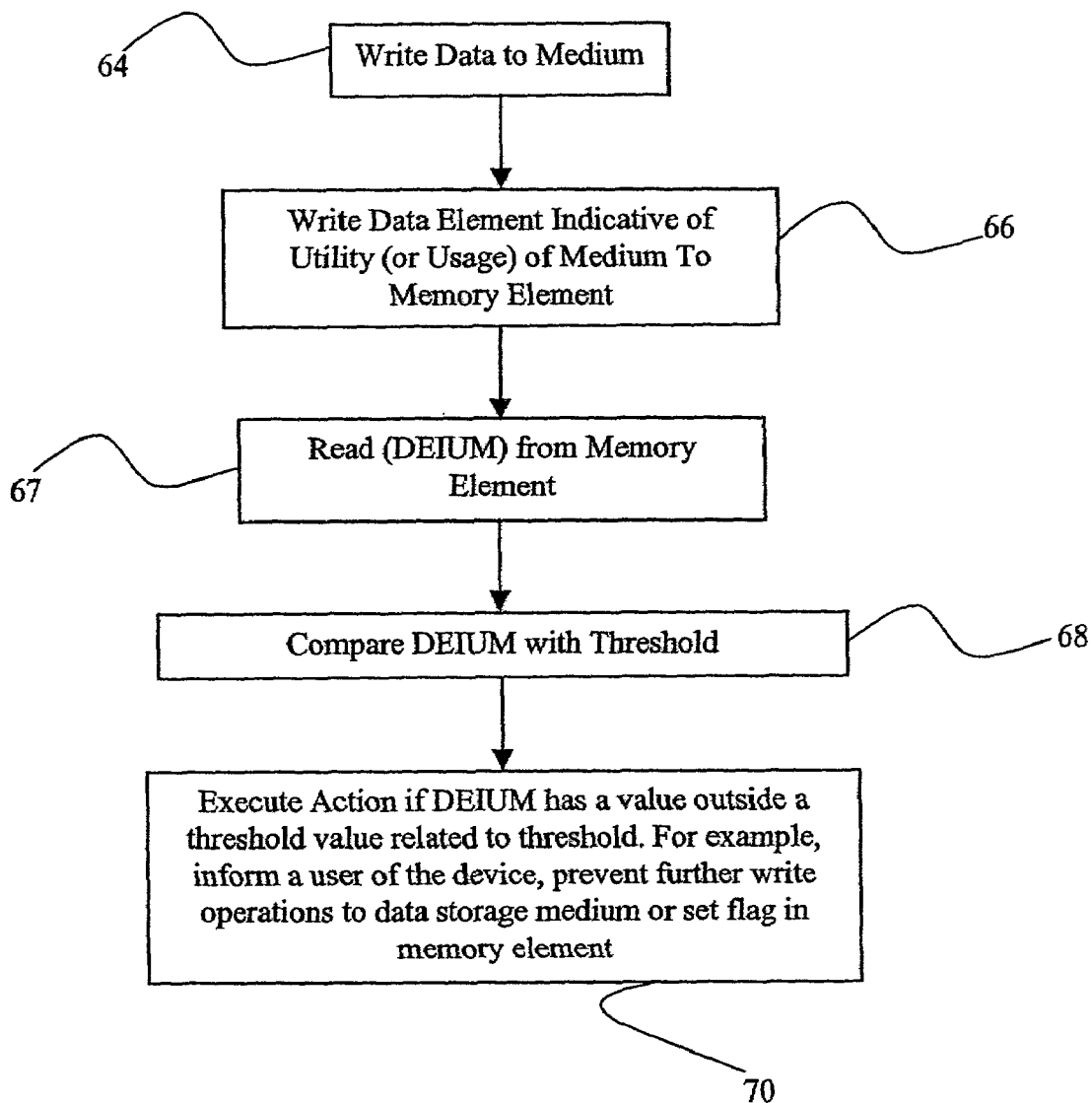
FIG. 6 is a flow chart detailing a method of data storage device monitoring according to an aspect of the present invention.

FIG. 6 is a flowchart demonstrating a method of monitoring a data storage device 10 comprising writing data to a data storage medium such as, for example, the tape 13, (Step 64). A data element indicative of the utility (DEIUM) of the tape 13 is written to the MIC 18 (Step 66) at the end of writing of the data to the tape 13. Alternatively, the DEIUM can be written to the MIC 18 immediately prior to the removal of the cassette 11 from the bay 25.

The cassette 11 is typically removed from the tape drive 24 and may be transferred to another tape drive or simply stored for later use with the tape drive 24. Assuming that the cassette 11 placed in a tape drive 24 with the capability to access the MIC 18 the DEIUM is read (Step 66). If the cassette is placed in a tape drive that is not capable of reading the DEIUM the tape is read in the normal way without the added utility check.

The read DEIUM is compared with a reference (Step 68). This comparison to the reference may be a direct comparison of numerical values, a cyclic redundancy check or a comparison of a string of characters.

Should the comparison of the DEIUM to the reference fail an action is executed (Step 70). The action executed in response to the comparison of the DEIUM with the reference (Step 70) will typically be informing a user of the storage device that the medium has passed a threshold and is potentially liable to failure and/or write protecting the medium in order to limit the opportunity for failure of the storage device.

The DEIUM is typically a measure of the quality of the medium, for example the number of low level (C1) error corrections that are carried out or the number of 'hard' media failures that have occurred with the medium, or a measure of the usage of the medium, such as the load count (i.e. the number of data sets written to the tape), the location and of data on the tape, the number of tape pulling hours, the end of data information (the number of times the tape has been written to), the number of times the tape has been updated or the write pass counter value.

The memory element 18 can also be used to retain tracking information such as the drive number and model that last executed a write operation to the tape. Alternatively, a complete history of the drives that have written to the tape can be stored in the memory element. This is useful to maintain security of sensitive data and also to decrease the opportunity for software piracy by allowing the tracing the history of media.

Figure 7:
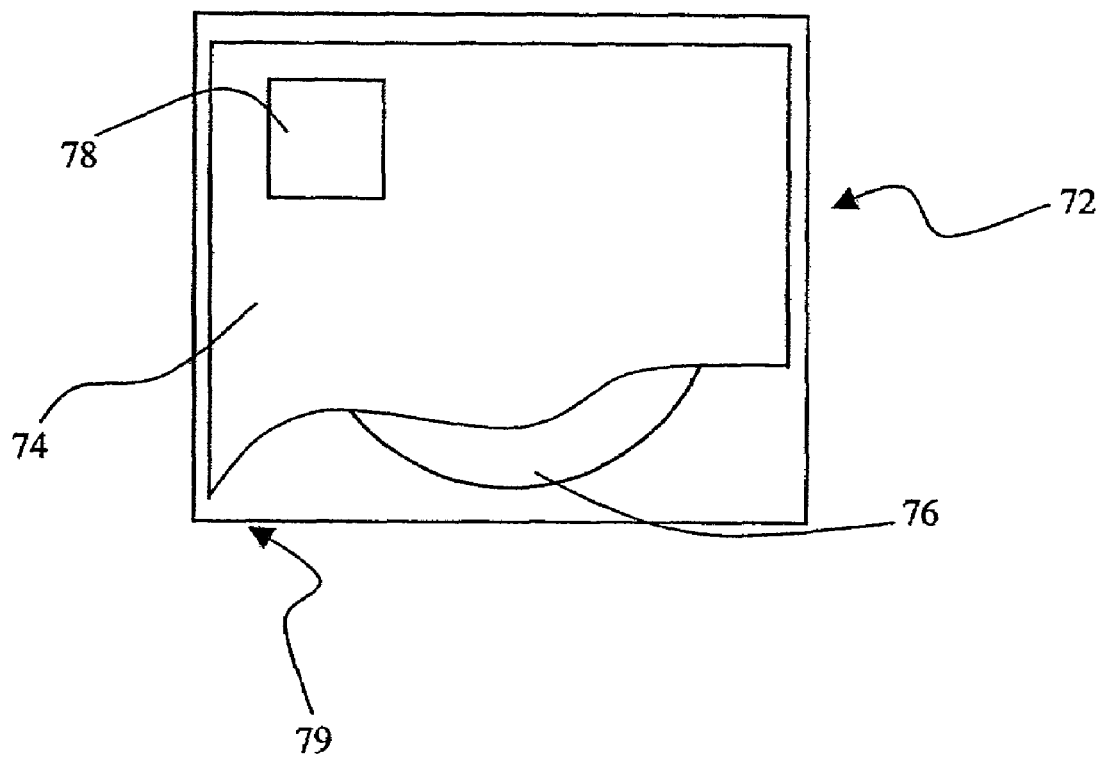
FIG. 7 is a sectional view of a disc data storage device according to an aspect of the present invention.

Referring now to FIG. 7 this shows a removable disc data storage device 72 comprising a casing 74, a disc 76, memory element 78 and a disc drive 79. The memory element is housed in the casing 74, stores similar information to that of the memory element 18 and is accessed via the drive 79 in a similar fashion to that of memory element 18.

It will be appreciated that the magnetic data storage disc device 72 could be a removable hard disc, a floppy disc, a magneto-optical disc, a mini-disc or a CD.

Figure 8:
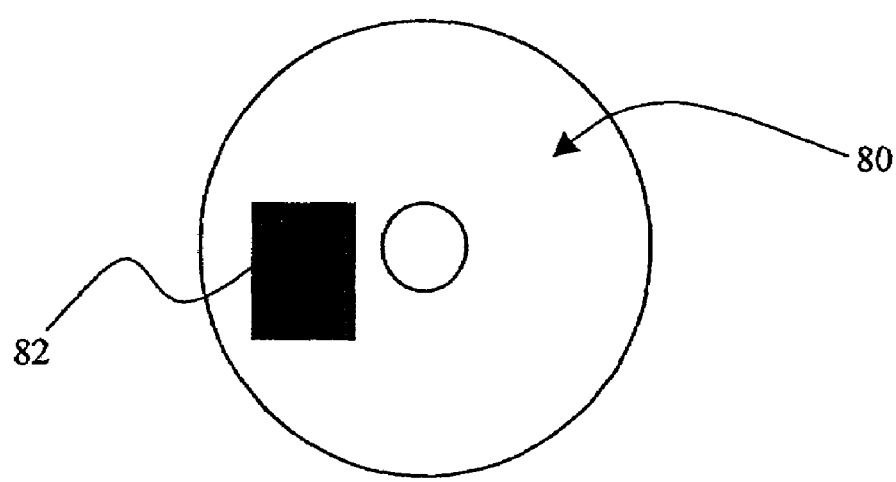
FIG. 8 is a representation of a data carrier carrying software or program instructions in accordance with any aspect of the present invention.

FIG. 8 is an illustration of a computer readable medium 80 having encoded upon it a program of instructions 82 which when executed upon a device cause it to operate in accordance with any one of the preceding embodiments of the present invention.

The evaluation of the data may be performed on the writer/reader device processor, the cassette/data-recording device having just memory/no processor. Alternatively the cassette may have a processor and at least some/not all processing may occur on the cassette/device itself (i.e. a "smart cassette").

It will be appreciated that it is possible to monitor the actual performance of a tape (or other data recording device) and to replace it/stop recording to it/cause an alarm to be raised when its actual measured performance is below an acceptable level. Such passive management of the data recording devices is acceptable, especially when the trigger threshold for the action dependent on the performance is far enough above the level at which data cannot be read from the device.

Another approach is to take a more proactive management role and to predict when problems me likely to occur in the future and take pre-emptive action. Such a prediction may be based upon a statistical probability, which in turn may be based upon a number of models. For example, a certain type of tape cassette may be known to exhibit read/write errors at an elevated level after a certain number of hours use, or after a certain number of starts. The prediction may not have any input from the particular tape cassette itself. On the other hand, there may be a model which suggests that a cassette tape will be prone to errors in the future after it has had more than a certain number of read/write errors in the pest, or in a predetermined period in the past. For example the control processor evaluating the performance or usage data may look for more than x read/Write errors in the past 100 uses of the tape or in the past 50 hours of use of the tape.

We claim:

1. A method of controlling a data storage device having a removable data storage medium having data stored thereon comprising the steps of:
   i) writing a data element to a memory element associated with, but different from, the data storage medium, the data element being indicative of at least one of (I) the utility of the data storage medium of the data storage device, and (II) a parameter or value associated with the level of usage of the data storage device;
   ii) reading said data element from said memory element;
   iii) evaluating the data element read from said memory element; and
   iv) preventing the writing of further data to the data storage medium in response to the evaluation of said data element read from said memory element having a value outside a threshold related to a reference for the read data value.

2. A method according to claim 1 comprising write protecting the data storage medium in response to the evaluation of said data element read from said memory element having a value outside the threshold related to the reference for the read data value.

3. A method according to claim 1 comprising displaying the result of the evaluation to a user of the device.

4. A method according to claim 1 comprising providing within said data element information relating to any one of the following:
   i) load count
   ii) guide usage
   iii) tape pulling hours
   iv) error correction rates
   v) write pass counter
   vi) number of updates
   vii) end of data
   viii) hard failure count.

5. A method according to claim 1 comprising providing said data storage device in any one of the following forms:
   i) a cassette containing magnetic tape
   ii) a magnetic disc
   iii) CD
   iv) a magneto-optical disc
   v) a mini-disc.

6. A method according to claim 1 comprising providing the memory element in the form of a non-volatile memory element.

7. A method according to claim 1 comprising providing the memory element in the form any one of the following:
   i) $E^2PROM$
   ii) flash card.

8. A method of controlling writing of data to a data storage medium of a data storage device, the medium storing data, comprising the steps of:
   i) reading a data element of the device from a memory element associated with the data storage device, the memory element differing from the medium, said data element being indicative of at least one of (I) the utility of the data storage medium of the device, and (II) a parameter or value associated with the level of usage of the data storage device;
   ii) evaluating the data element read from said memory element; and
   iii) preventing the writing of further data to the data storage medium in response to the evaluation of said data element read from said memory element having a value outside a threshold related to a reference for the read data value.

9. A method according to claim 8 comprising write protecting the data storage medium in response to the evaluation of said data element read from said memory element having a value outside the threshold related to the reference for the desired data value.

10. A method according to claim 8 comprising displaying the result of the evaluation to a user of the device.

11. A method according to claim 8 comprising providing within said data element information relating to any one of the following:
    i) load count
    ii) guide usage
    iii) tape pulling hours
    iv) error correction rates
    v) write pass counter
    vi) number of updates
    vii) end of data
    viii) hard failure count.

12. A method according to claim 8 comprising providing said data storage device in any one of the following forms:
    i) a cassette containing magnetic tape
    ii) a magnetic disc
    iii) a CD
    iv) a magneto-optical disc
    v) a mini-disc.

13. A method according to claim 8 comprising providing the memory element in the form of a non-volatile memory element.

14. A method according to claim 8 comprising providing the memory element in the form any one of the following:
    i) $E^2PROM$
    ii) flash card.

15. A method according to claim 8 comprising generating a history of the usage of the storage device from said data element.

16. A method according to claim 15 comprising containing in said history timestamps, date stamps and writer identifications for each time the device was written to.

17. A data storage device controlling method comprising the steps of:
    i) writing at least one of (a) a data element indicative of the utility of a data storage medium of the device to a memory element associated with the data storage device, the memory element storing data and differing from the data storage medium, and (b) a data element indicative of the level of usage of the data storage medium of the device to the memory element associated with the data storage device;

ii) reading said data element from said memory element;

iii) comparing said read data element with a reference; and iv) preventing the writing of further data to the data storage medium if said data element has a value outside a threshold related to the reference.

18. A method according to claim 17 comprising informing a user of the device that the utility of the data storage medium is outside the threshold value.

19. A method according to claim 17 comprising write protecting the data storage medium if the data element has a value outside the threshold related to the reference.

20. A data storage device controlling method comprising the steps of:

i) writing at least one of (a) a data element indicative of the utility of a data storage medium of the device to a memory element associated with the data storage device, and (b) a data element indicative of the level of usage of the data storage medium of the device to the medium element associated with the data storage device;

ii) reading said data element from said memory element iii) comparing said read data element with a reference;

iv) executing an action if said data element has a value outside a threshold related to the reference, and v) setting a flag associated with the memory element so as to prevent the writing of data to the storage medium.

21. A method according to claim 17 comprising reading the data element from the memory element via any one of the following:

i) a radio frequency data link ii) an inductive data link iii) a direct electrical connection.

22. A method according to claim 17 comprising providing within said data element information relating to any one of the following:

i) load count ii) guide usage iii) tape pulling hours iv) error correction rates v) write pass counter vi) number of updates vii) end of data viii) hard failure count.

23. A method according to claim 17 comprising providing said data storage device in any one of the following forms:

i) a cassette containing magnetic tape ii) a magnetic disc iii) a CD iv) a magneto-optical disc v) a mini-disc.

24. A method according to claim 17 comprising providing the memory element in the form of a non-volatile memory element.

25. A method according to claim 17 comprising providing the memory element in the form any one of the following:

i) $E^2PROM$ ii) flash card.

26. A method according to claim 17 comprising generating a history of the usage of the storage device from said data element.

27. A method according to claim 26 comprising containing in said history timestamps, date stamps and writer identifications for each time the device was written to.

28. A data storage device controlling method, the device including a medium storing data, comprising the steps of:

i) reading a data element from a memory element associated with the data storage device, the memory element storing data and differing from the data storage medium, said data element being indicative of at least one of (a) the utility of a data storage medium of the device, and (b) the level of past usage of the data storage device;

ii) comparing said read data element with a reference; and iii) preventing writing of further data to the data storage medium if said data element has a value outside a threshold related to the reference.

29. A method according to claim 28 comprising informing a user of the device that the utility of the data storage medium is outside the threshold value.

30. A method according to claim 28 comprising write protecting the data storage medium if said data element has a value outside the threshold related to the reference.

31. A data storage device controlling method comprising the steps of:

i) reading a data element from a memory element associated with the data storage device, said data element being indicative of at least one of (a) the utility of a data storage medium of the device, and (b) the level of past usage of the data storage device;

ii) comparing said read data element with a reference;

iii) executing an action if said data element has a value outside a threshold related to the reference; and iv) setting a flag associated with the memory element so as to prevent the writing of data to the storage medium.

32. A method according to claim 28 comprising reading the data element from the memory clement via any one of the following:

i) a radio frequency data link ii) an inductive data link iii) a direct electrical connection.

33. A method according to claim 28 comprising providing within said data element information relating to any one of the following:

i) load count ii) guide usage iii) tape pulling hours iv) error correction rates v) write pass counter vi) number of updates vii) end of data viii) bard failure count.

34. A method according to claim 28 comprising providing said data storage device in any one of the following forms:

i) a cassette containing magnetic tape ii) a magnetic disc iii) a CD iv) a magneto-optical disc v) a mini-disc.

35. A method according to claim 28 comprising providing the memory element in the form of a non-volatile memory element.

36. A method according to claim 28 comprising providing the memory element in the form any one of the following:

i) $E^2PROM$ ii) flash card.

37. A method according to claim 28 comprising generating a history of the usage of the storage device from said data element.

38. A method according to claim 37 comprising containing in said history timestamps, date stamps and writer identifications for each time the device was written to.

39. A reader or a writer device adapted to (a) read data from or write data to a removable data carrier, and (b) read data from or write data to a memory element associated with, but differing from, the carrier, the data adapted to be read from or written to the memory element being at least one of data carrier usage data or data carrier performance data, said device having a data transfer arrangement for reading and or writing data onto the medium, and a control processor adapted to receive signals from said memory element arrangement indicative of the data carrier usage or performance data, and wherein said control processor is adapted, in use, to compare the data carrier usage or performance data with reference values therefor to establish whether the data carrier has exceeded a permissible level of usage and/or level of performance problems, and upon establishing that said data carrier has exceeded said permissible level of usage or problems to generate a write protect signal and transmit said write protect signal to said memory element the write protect signal, when read, being such as to prevent further writing by the data transfer head on the data carrier with which the memory element is associated.

* * * * *

UNITED STATES PATENT AND TRADEMARK OFFICE
CERTIFICATE OF CORRECTION

| | | |
|---|---|---|
| PATENT NO. | : 7,075,874 B2 | Page 1 of 2 |
| APPLICATION NO. | : 09/905984 | |
| DATED | : July 11, 2006 | |
| INVENTOR(S) | : Nigel Kevin Rushton et al. | |

It is certified that error appears in the above-identified patent and that said Letters Patent is hereby corrected as shown below:

On the face page, in field (54), in "Title", in column 1, line 3, after "CARRIER" insert -- FOR --.

In column 1, line 3, after "CARRIER" insert -- FOR --.

In column 2, line 35, delete "E 2PROM" and insert -- $E^2PROM$ --, therefor.

In column 3, line 20, delete "E 2PROM" and insert -- $E^2PROM$ --, therefor.

In column 3, line 59, delete "E 2PROM" and insert -- $E^2PROM$ --, therefor.

In column 4, lines 33-34, delete "E 2PROM" and insert -- $E^2PROM$ --, therefor.

In column 4, line 60, delete "E 2Prom" and insert -- $E^2PROM$ --, therefor.

In column 6, line 15, delete "E 2PROM" and insert -- $E^2PROM$ --, therefor.

In column 7, line 40, delete "E 2typically" and insert -- $E^2PROM$ typically --, therefor.

In column 7, line 41, delete "(MCI)" and insert -- (MIC) --, therefor.

In column 11, line 5, delete "me" and insert -- are --, therefor.

In column 11, line 15, delete "pest" and insert -- past --, therefor.

UNITED STATES PATENT AND TRADEMARK OFFICE
CERTIFICATE OF CORRECTION

PATENT NO.         : 7,075,874 B2
APPLICATION NO. : 09/905984
DATED               : July 11, 2006
INVENTOR(S)       : Nigel Kevin Rushton et al.

It is certified that error appears in the above-identified patent and that said Letters Patent is hereby corrected as shown below:

In column 13, line 20, in Claim 20, delete "medium" and insert -- memory --, therefor.

In column 13, line 22, in Claim 20, delete "element" and insert -- element; --, therefor.

In column 14, line 31, in Claim 32, delete "clement" and insert -- element --, therefor.

In column 14, line 46, in Claim 33, delete "bard" and insert -- hard --, therefor.

In column 16, line 8, in Claim 39, delete "element" and insert -- element, --, therefor.

Signed and Sealed this

Twenty-sixth Day of May, 2009

JOHN DOLL
*Acting Director of the United States Patent and Trademark Office*